United States Patent [19]

Blount

[11] 3,993,737

[45] Nov. 23, 1976

[54] PROCESS FOR THE PRODUCTION OF SILICOFORMIC ACID

[76] Inventor: David H. Blount, 5450 Lea St., San Diego, Calif. 92105

[22] Filed: Sept. 12, 1975

[21] Appl. No.: 612,843

Related U.S. Application Data

[63] Continuation-in-part of Ser. No. 262,485, June 14, 1972, abandoned, which is a continuation-in-part of Ser. No. 71,628, Sept. 11, 1970, abandoned.

[52] U.S. Cl. .............................. 423/325; 423/304; 423/520; 423/522
[51] Int. Cl.² ......................................... C01B 33/00
[58] Field of Search ............ 423/325, 339, 520, 522

[56] References Cited

UNITED STATES PATENTS 3,929,972  12/1975  Blount .............................. 423/325

3,937,782  2/1976  Blount ........................... 423/520 X

OTHER PUBLICATIONS

Jacobson's "Encyclopedia of Chem. Reactions", vol. 6, 1956 Ed., p. 118, Reinhold Pub. Corp., N.Y.

*Primary Examiner*—Edward Stern

[57] ABSTRACT

A dry alkaline earth metal metasilicate or an alkali metal metasilicate is chemically reacted with a concentrated mineral acid in the ratio of 1:3 mols to produce silicoformic hydrogen salts and an alkali hydrogen salt. The silicoformic hydrogen salt is washed with water then filtered to remove the salt and mineral acid, thereby producing silicoformic acid.

5 Claims, No Drawings

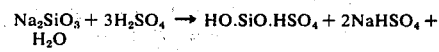

PROCESS FOR THE PRODUCTION OF SILICOFORMIC ACID

CROSS-REFERENCE TO RELATED APPLICATIONS

This application is a continuation-in-part of my copending U.S. patent application Ser. No. 262,485, filed June 14, 1972, now abandoned, which is a continuation-in-part of my earlier U.S. patent application Ser. No. 71,628, filed Sept. 11, 1970, now abandoned.

BACKGROUND OF THE INVENTION

This invention relates to a process for producing novel silicoformic acid (H.SiO.OH), which may be used as a filler in elastomers, resins, molding powders and pigments, as gas and oil absorbents, as a vehicle for insecticides and aromatics, as an anticaking agent, as a thickening agent, as a thixotropic agent for many liquids, as a vehicle for catalysts, as insulating material, as a flatting agent for paints, lacquers and other organic coatings, as a bodying agent and as a polishing abrasive; it may be used in the manufacturing of soaps and detergents, in the polymerization process of plastics, elastomers and natural products. Silicoformic acid will react chemically with many organic compounds by the use of a suitable catalyst.

Silicoformic acid will chemically react with many alkali inorganic chemicals; it is soluble in dilute alkali solutions of alkali metal hydroxides and solutions containing a salt of a strong alkali and a weak acid. These solutions may be used as adhesives and coating agents.

It is an object of this invention to provide a process for producing silicoformic acid.

Another object is to produce novel silicoformic acid.

A further object is to produce novel silicoformic acid which readily reacts with organic compounds to form useful organic silicates.

A still further object is to produce novel silicoformic acid which will readily react with inorganic compounds to form useful inorganic silicates.

SUMMARY OF THE INVENTION

I have discovered that a dry granular alkali metal metasilicate or an alkaline earth metal metasilicate will chemically react with a mineral acid to produce silicoformic hydrogen salt and an alkali hydrogen salt. The acid and hydrogen salt is removed by washing with water and filtering.

The present invention reacts about one mol equivalent of a dry alkaline earth metal metasilicate or an alkali metal metasilicate with 3 mol equivalents of a concentrated mineral acid. Sodium metasilicate with less than 6 mols of water per mol of sodium metasilicate is the preferred alkali metal metasilicate and concentrated sulfuric acid is the preferred mineral acid in this present invention. Dry calcium metasilicate is the preferred alkaline earth metal metasilicate. Other alkali metal metasilicates may be used as the starting meterial such as potassium, lithium, rubidium and cesium; metal metasilicates may also be used. Concentrated mineral acids are preferred for this invention, but a dilute acid may be used. When dilute acids are used, some silicic acid is produced with the silicoformic acid. When more than 6 mols of water are present with the alkali metal metasilicate, silicic acid and silicon dioxide are produced along with silicoformic acid.

DETAILED DESCRIPTION OF THE INVENTION

The method of this invention is to add a dry alkali metasilicate and a concentrated mineral acid simultaneously into a suitable vessel in the ratio of about 1:3 mol equivalents, and the chemical reaction takes place as follows:

$$Na_2SiO_3 + 3H_2SO_4 \rightarrow HO.SiO.HSO_4 + 2NaHSO_4 + H_2O$$

The silicoformic hydrogen salt (silicoformic hydrogen sulfate) is then washed with water to produce silicoformic acid; the hydrogen salt and dilute acid are filtered off.

Another method is to add the dry alkali metasilicate gradually to the concentrated mineral acid in the ratio of about 1:3 mol equivalents. The general chemical reaction is complicated because you start out with an excess of mineral acid and, at the end of the reaction, there is a ratio of about 1:3 mol equivalents. There is a mixture of silicoformic hydrogen salts produced, namely silicoformic hydrogen sulfate and dihydroxyl silicon hydrogen sulfate [H(OH)$_2$Si(HSO$_4$)]. The silicoformic hydrogen salts are washed with water to produce silicoformic acid. The dilute mineral acid and hydrogen salt are filtered off, thereby recovering the silicoformic acid.

DESCRIPTION OF PREFERRED EMBODIMENTS

My invention will be illustrated in greater detail in the specific examples which follow, it being understood that these preferred embodiments illustrate, but do not limit, the procedures which may be used in the production of silicoformic acid. Parts and percentages are by weight unless otherwise indicated.

Example I

About 10 parts by weight of granular sodium silicate with less than 6 mols of water per mol of sodium metasilicate are added gradually to about 15 parts by weight of concentrated sulfuric acid with agitation to keep the temperature below 100° C. The chemical reaction is complete in about 2–6 hours. The mixture of silicoformic hydrogen sulfate, dihydroxyl silicon hydrogen sulfate, sodium hydrogen sulfate and water is washed with water. The water reacts with silicoformic hydrogen sulfate and dihydroxyl silicon hydrogen sulfate to produce silicoformic acid and dilute sulfuric acid. The dilute sulfuric acid and sodium hydrogen sulfate are filtered off to recover the silicoformic acid.

Example II

About 1 mol of granular sodium metasilicate pentahydrate is added gradually to about 3 mols of concentrated sulfuric acid while mixing to keep the temperature below 100° C. The chemical reaction is completed in about 2–6 hours, thereby producing a white granular mixture of silicoformic hydrogen sulfate (HO.SiO.HSO$_4$), dihydroxyl silicon hydrogen sulfate [H(OH)$_2$Si(HSO$_4$)], and sodium hydrogen sulfate. The said white granular mixture is then washed with water, thereby producing silicoformic acid, dilute sulfuric acid and sodium hydrogen sulfate. The sulfuric acid and sodium hydrogen sulfate are filtered off, thereby recovering the silicoformic acid. The silicoformic acid may be air dried by blowing warm air of 25°–100° C thru the white granules to produce a fine, white granular powder.

Example III

About 20 parts by weight of potassium metasilicate with less than 6 mols of water per mol of potassium metasilicate are added gradually to about 30 parts by weight of concentrated phosphoric acid while agitating to keep the temperature below 100° C. The chemical reaction is completed in about 2–6 hours, thereby producing a white granular mixture of silicoformic dihydrogen phosphate and potassium dihydrogen phosphate. The said mixture is then washed with water and filtered to remove the dilute phosphoric acid and potassium hydrogen phosphate, thereby recovering silicoformic acid.

Example IV

About one mol of granular sodium metasilicate with less than 6 mols of water per mol of sodium metasilicate and about 3 mols of concentrated sulfuric acid are added simultaneously into a suitable vessel while stirring and keeping the temperature below 100° C. The reaction is completed in about 2–6 hours, thereby producing a white granular mixture of silicoformic hydrogen sulfate and sodium hydrogen sulfate. The said mixture is then washed with water, filtered to remove the dilute sulfuric acid and sodium hydrogen sulfate, thereby recovering silicoformic acid.

Example V

About 2 parts by weight of granular potassium metasilicate having less than 6 mols of water per mol of potassium metasilicate and about 3.5 parts by weight of concentrated sulfuric acid are slowly added simultaneously into a suitable vessel in the ratio of about 2:3.5 by weight, while agitating and keeping the temperature below 100° C. The chemical reaction is completed in about 2–6 hours, thereby producing a white granular mixture of silicoformic hydrogen sulfate and potassium hydrogen sulfate. The said white granular mixture is then washed with water, thereby producing silicoformic acid, potassium hydrogen sulfate and dilute sulfuric acid; it is then filtered to remove the dilute sulfuric acid and potassium hydrogen sulfate, thereby recovering a white granular compound, silicoformic acid (H.SiO.OH).

Example VI

About 1 mol of granular sodium metasilicate pentahydrate and about 3 mols of concentrated phosphoric acid are added simultaneously into a suitable vessel in the ratio of about 1:3 mols while agitating and keeping the temperature below 100° C. The chemical reaction is completed in about 2–6 hours, thereby producing a white granular mixture of silicoformic dihydrogen phosphate, sodium dihydrogen phosphate and water. The said white granular mixture is washed with water, thereby producing silicoformic acid, dihydrogen phosphate and dilute phosphoric acid. The sodium dihydrogen phosphate and dilute phosphoric acid are filtered off, thereby recovering silicoformic acid.

Although certain specific preferred ingredients and conditions are described in conjunction with the above detailed description of the Invention and Examples, these may be varied and other ingredients may be used where suitable, with similar results.

Other applications, modifications and ramifications of this invention will occur to those skilled in the art upon reading this disclosure. These are intended to be included within the scope of this invention, as defined in the appended claims.

I claim:
1. The process for the production of silicoformic hydrogen salt and silicoformic acid which comprises the steps of:
    a. providing a dry granular alkali metal metasilicate with less than 6 mols of water per mol of the alkali metasilicate;
    b. adding said alkali metal metasilicate gradually to concentrated mineral acid in the ratio of 1 to 3 mols;
    c. mixing and maintaining said mixture at a temperature below 100° C until the chemical reaction is completed in about 2 to 6 hours, thereby
    d. producing a white granular mixture of silicoformic hydrogen salt, dihydroxyl silicon hydrogen salt, alkali metal hydrogen salt and water;
    e. washing said white granular mixture with water, and the water reacts with the silicoformic hydrogen salt and dihydroxyl silicon hydrogen salt, thereby
    f. producing silicoformic acid and dilute mineral acid;
    g. filtering off alkali metal hydrogen salt and dilute mineral acid, thereby
    h. recovering a white granular compound, silicoformic acid.

2. The process according to claim 1 wherein said alkali metal metasilicate is sodium metasilicate.

3. The process according to claim 1 wherein said alkali metal metasilicate is sodium methasilicate pentahydrate.

4. The process according to claim 1 wherein said alkali metal metasilicate is potassium metasilicate.

5. The process according to claim 1 wherein said mineral acid is sulfuric acid, and the silicoformic hydrogen salt produced is silicoformic hydrogen sulfate (HO.SiO.HSO$_4$) and the dihydroxyl silicon hydrogen salt produced is dihydrogen silicon hydrogen sulfate H(HO)$_2$Si(HSO$_4$).

* * * * *